July 26, 1960
R. C. HARE
2,946,195
POWER OPERATED MASTER CYLINDER
Filed July 8, 1957
2 Sheets-Sheet 1
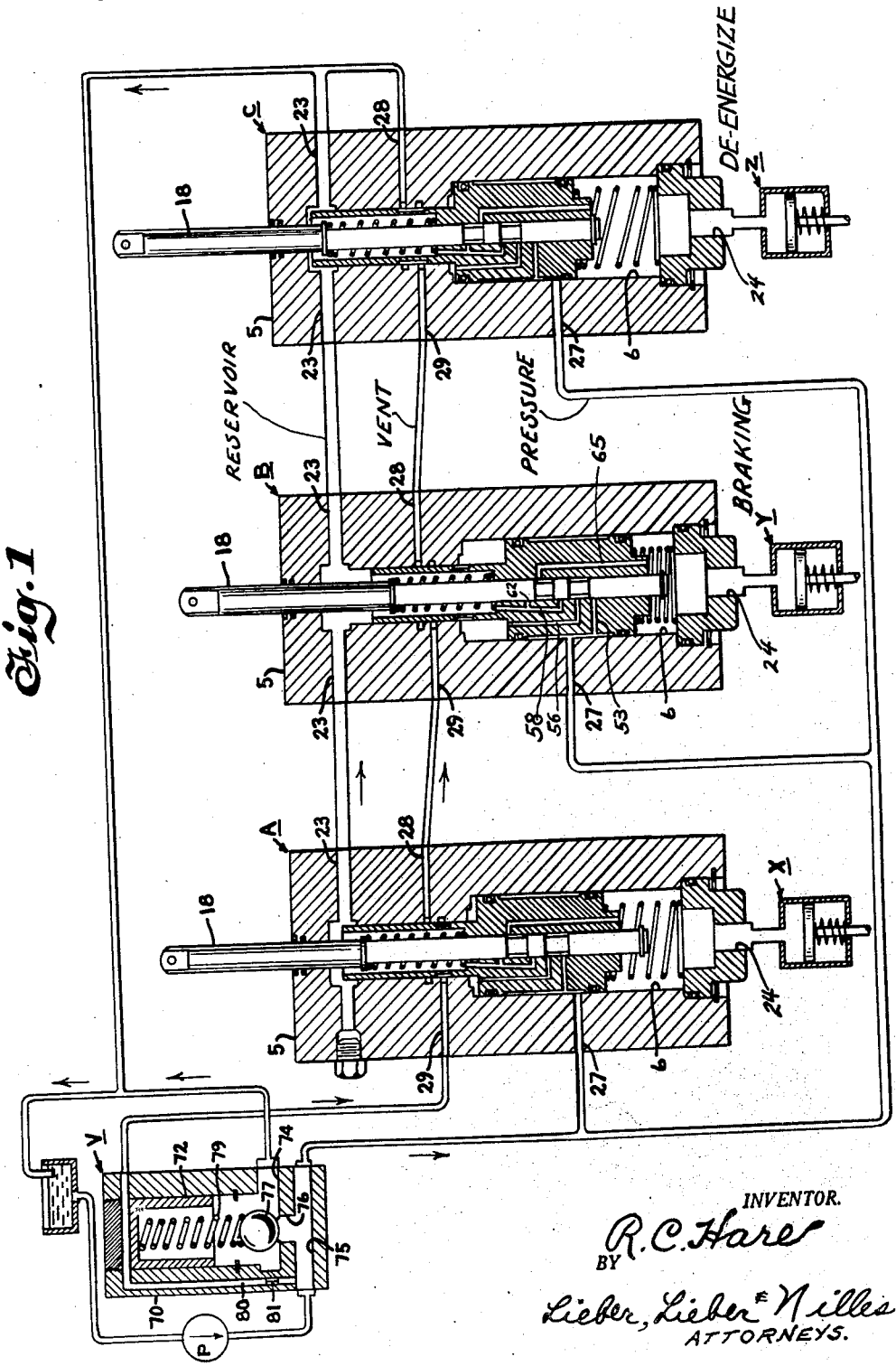
INVENTOR.
R. C. Hare
BY
Lieber, Lieber & Nilles
ATTORNEYS.

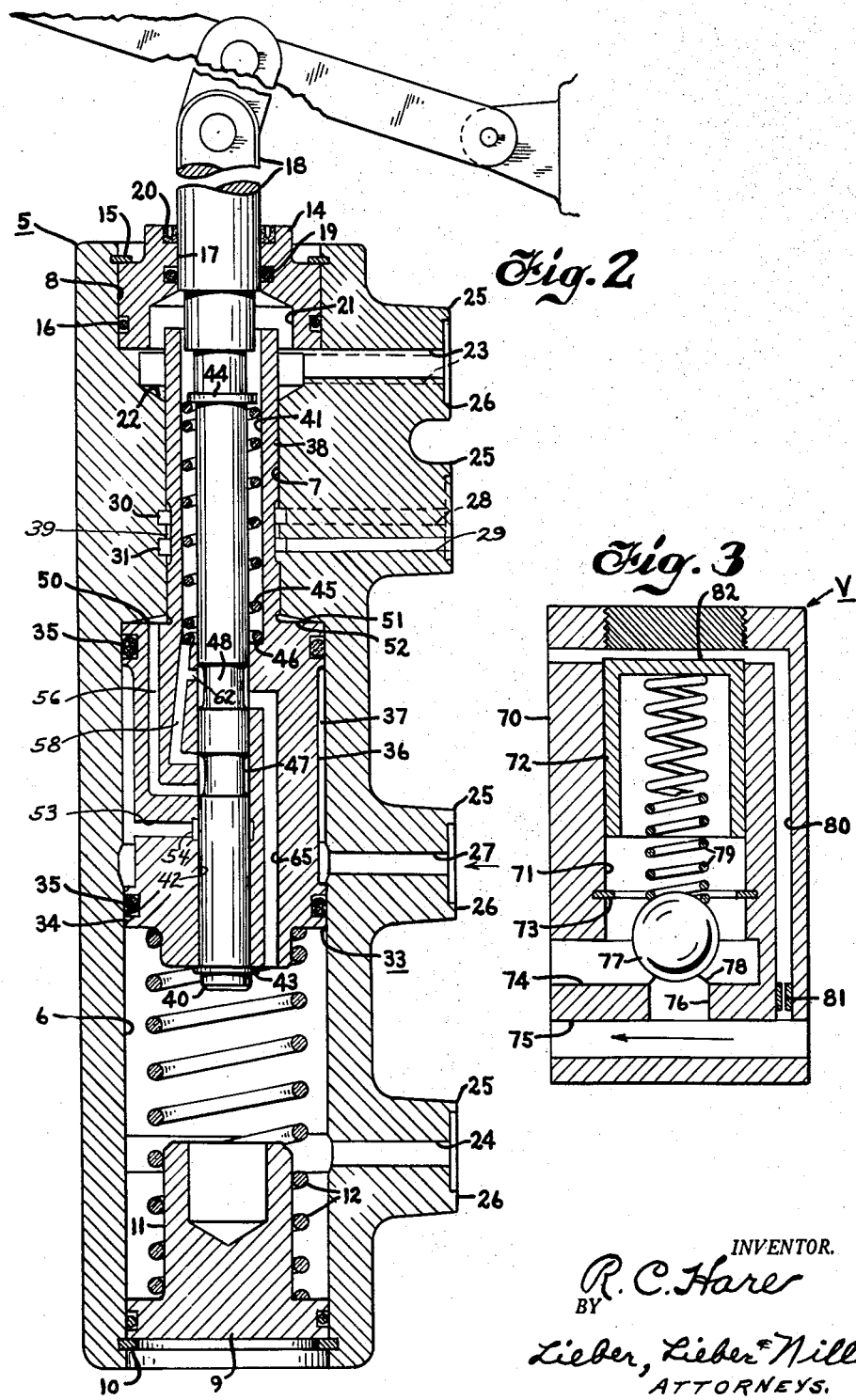

United States Patent Office 2,946,195
Patented July 26, 1960

2,946,195
POWER OPERATED MASTER CYLINDER

Richard C. Hare, Wauwatosa, Wis., assignor to Dynex, Inc., Pewaukee, Wis., a corporation of Wisconsin Filed July 8, 1957, Ser. No. 670,607

3 Claims. (Cl. 60—54.5)

This invention relates to hydraulic systems and novel actuator and control valves therefor.

The invention finds particular utility when used on excavating equipment or the like which have various power operated component parts such as brakes, clutches and reels.

Conventional hydraulic systems have been proposed for operating these various parts but, generally, they have been complicated in structure and operation, having numerous and expensive parts, such as unloading valves and accumulators to insure proper pressures in the system at all times. The use of unloading valves in such systems usually results in a varying control pressure thus giving a variable source of power. Other systems tap off manifold pressure from the main power source of the prime mover, which results in complete loss of control of all of the component parts in the event of power interruption.

The present invention provides actuator valves which are connected with their pressure and tank lines in parallel and the vent lines in series, whereby operation of any actuating valve will close the normally open vent line but not the pump and tank lines. The vent line in turn actuates the vent control valve which provides maximum pump pressure. The arrangement permits the use of closed center actuator valves without the use of an unloading valve or accumulator. The units to be operated, such as clutches and brakes, will not be subjected to maximum pump pressure unless the operator demands it, and the pressure at each unit may be controlled and varied independently of the others.

Still another object of the invention is to provide an actuator valve having a force feed-back characteristic. This proportional feed-back of the load to the operator's handle gives him a good degree of "load sense," enabling him to feel the engagement of the unit being actuated.

The present invention provides a hydraulic power operated master cylinder which has novel control porting in the piston thereof.

Other objects and advantages will appear hereinafter as this disclosure progresses, references being had to the accompanying drawings in which:

Figure 1 is a schematic diagram of the system showing three of the actuator valves banked together for operating various units.

Figures 2 is a sectional view of one of the actuator valves shown in Figure 1, but on an enlarged scale, and its position corresponds with valve C in Fig. 1.

Figure 3 is a schematic view of the pressure control valve shown in Figure 1, in section and on an enlarged scale.

Referring in greater detail to the drawings, and particularly Figure 2, the actuator valve comprises the housing 5 having a cylinder 6 formed by a large bore extending from one of its ends for a substantial portion of its length. A smaller bore 7 extends from cylinder 6 and terminates in a counterbore 8 at the other end of the housing 5. A plug 9 is sealingly inserted at the cylinder end and held therein by snap ring 10. The plug has a center hub portion 11 around which a spring 12 is slipped and which seats against the plug.

The other end of the housing 5 is sealed by plug 14 held in counterbore 8 by snap-ring 15. An O ring 16 seals between the counterbore 8 and plug 14. The plug 14 has a bore 17 through which the stem 18 is slidable and sealed against leakage by O ring 19 and shaft seal 20. The plug 14 has an annular recess 21 on its inner side which is adjacent a similarly shaped annular recess 22 in the housing.

Tank return passageways 23 extend from the recesses 21, 22 to the outside of the housing 5.

Pressure fluid is discharged from the cylinder 6 through the discharge port 24. The various large bosses 25 have surfaces 26 which may be manifolded to a common subplate when the actuator valves are used in banks. The fluid is discharged through port 24 to the part to be actuated such as a brake or clutch cylinder or the like.

Fluid under pressure is admitted from a pump P to the cylinder 6 through the inlet port 27.

Vent control passageways 28, 29 extend from their respective annular chambers 30, 31 formed in bore 7 to the exterior of the housing 5.

A master piston 33 is reciprocally mounted within the housing 5 and has an enlarged end portion or head 34 which is sealed for sliding engagement with cylinder 6 by the O rings 35. Piston head 34 has a section 36 of its axial length reduced in diameter so as to form an annulus chamber 37 with cylinder 6.

The spring 12 bears against piston 33, biasing it upwardly as viewed in the drawings, or to the de-energized position.

The piston 33 also includes a sleeve 38 of reduced diameter which forms a sliding seal fit with bore 7. Sleeve 38 has a groove 39 around its periphery which serves to place vent passageways 28 and 29 in fluid communication with each other when the stem 18 is in the position shown in Figure 2. In this position the valve is de-energized or inoperative and the vent passages 28 and 29 are open or unblocked. In this position fluid pressure is blocked by the control spool as will appear.

A control spool 40 extends from step 18, and is telescopingly connected therewith within limits. The spool extends through the large bore 41 in piston sleeve 38 and forms a sliding seal fit with the bore 42 in piston head 34. A snap ring 43 prevents withdrawal upwardly of the spool from the piston and a ring 44 is also secured to the spool adjacent its other end. A spring 45 is placed over the spool and at one end seats against washer 44. The other end of the spring seats against the shoulder 46 formed by the juncture of bores 41 and 42 and thus biases the control spool 40 upwardly (as viewed in Fig. 2) relative to the piston 33. A pressure control groove 47 and a prefill groove 48 are turned on the spool and are axially spaced a distance apart.

A control area 50 is formed by the control surface or shoulder 51 which joins bore 7 and cylinder 6, the rear end 52 of piston head 34, the cylinder 6 and the piston sleeve 38.

A pressure inlet passageway 53 connects the annulus chamber 37 with the groove 54 in bore 42. A passage 56 connects the control area 50 with bore 42. With this porting arrangement, when the spool is moved downwardly, as viewed in Figure 2, by the operator shifting the stem 18, the groove 47 will place passages 53 and 56 in fluid communication with one another. As shown in Fig. 1 by the valve A, pressure fluid is then permitted to pass through inlet port 27, passage 56, and into the control area 50.

When in this operating position the vent passages 28, and 29 are blocked because their interconnecting groove 39 no longer places them in registry.

The control area 50 is a pressure debooster because the area 52 on the back of the piston head 34 and against which the fluid pressure reacts is considerably less than the area formed by the front or cylinder end of the piston assembly. For example, depending of course on the difference in these areas, there may be 1,000 pounds pressure in the control area and only 500 in the cylinder 6.

Pressure fluid is available to each of the master cylinder units regardless of the operating position of any one of them.

When the spool and piston are in the position as indicated by valve A, tank return passageways 23 are in fluid communication with bore 41 and with drain passage 58. Another passage 62 extends from drain passage 58 to groove 48.

Passage 60, which is drilled between chamber 37 and bore 42, extends through passage 58 and is also in communication with tank return passageways 23 when this position of the spool is reached. A press fitted ball 61 prevents pressure from entering passage 60 from chamber 37. Another passage 62 extends from chamber 37 to bore 42 and also passes through drain passage 58. Another press seated ball 63 prevents pressure fluid from passing from chamber 37 to bore 42.

A prefill passageway 65 connects cylinder 6 with bore 42. When the spool 40 is in the position shown for valve A, the prefill passage 65 and groove 48 are filled with pressure fluid from cylinder 6. Groove 48 is not in communication with any other passage at this time.

The functions of the prefill passage 65 are twofold; it functions to prefill the cylinder 6 from the tank passage 23 and also acts as a pressure equalizer between cylinder 6 and the tank return, when the valve is in the de-energized position as shown by valve C in Fig. 1 and by the valve of Fig. 2. The path of fluid communication between cylinder 6 and the tank passageway 23 is along prefill passage 65, groove 48, passage 62, passage 58, bore 41 and counterbore 21.

When the spool is in the position shown in valve C of Fig. 1 or in Fig. 2, the valve is completely relaxed or de-energized and fluid is in all the passageways and cylinder at tank line pressure. Pressure fluid is blocked from reaching the control area 50 because inlet passage 53 is blocked by the land of the spool. The vent lines 28, 29 are connected by groove 39 and thus the open position.

When the spool 40 is moved slightly inwardly toward the cylinder end, the prefill line is blocked off by the first 1/16 inch of spool movement because passage 62 is blocked by the spool. The pressure inlet 53 is still blocked by the spool. This initial movement slightly compresses spring 45 but insufficiently to cause the piston to move downwardly. Therefore, the vent lines 28, 29 remain connected or "open."

When the spool has been moved further downwardly by additional movement of the stem 18 a braking stage will be reached as shown by valve B of Fig. 1 as follows. A certain amount of pressure fluid has been admitted to the control area 50 through passage 53, groove 47 and passage 56 to move the piston downwardly. When the desired movement of the corresponding slave cylinder Y has been obtained, the spool blocks the pressure inlet 53 as shown by valve B. At this stage the vent lines 28, 29 are blocked by piston sleeve 38.

When more than one actuator valve is used in the system, in series as shown in Figure 1, all valves are operated independently for controlling their respective slave cylinders or other devices. With this arrangement all of the vent lines are connected in series as shown. When one of the vent lines is blocked, as described above, a pressure control valve V goes into a "power position." In other words, any interruption in the vent line actuates the control valve V to the high pressure position. When the vent line is closed, the control valve is closed and a constant pressure is available to all the actuating valves as desired. There is thus provided a "parallel" function of operation in a bank of valves arranged in "series." Stated otherwise, pressure on one actuating valve insures a constant pressure source for all of them.

The construction and operation of the pressure control valve is as follows, reference being had particularly to Fig. 3.

The pressure control valve V is very positive in operation and is of the "on-off" type. A housing 70 has a bore 71 in which is reciprocable a loading piston 72. Downward movement of the piston 72 is limited by the stop 73 formed by a snap ring. The bore 71 is communicable with the reservoir or supply tank S through a port 74. Fluid pressure can pass through the housing in passage 75, in the direction indicated by the arrows, directly to the actuator valves. Passage 75 can also be placed in fluid communciation with the sump S through passage 76 when the check valve ball 77 is lifted from its seat 78. A spring 79 yieldingly holds the ball in its seating position to prevent flow of pressure fluid directly to the sumps.

The control valve has a vent pasage 80 which provides for fluid communication between the pressure supply line, the actuator valves and the sump. A restriction in the vent pasage 80 is provided in the form of an orifice 81, across which there is a pressure differential when the vent line is open or unblocked. The area of the end 82 of piston 72 is considerably larger than the area of that part of ball 77 which seats in the passage 76, which gives a very positive action to the control valve.

Whenever the vent line is closed or blocked by shifting of the piston from the de-energized position, the pressure differential across the orifice 81 is stopped. The resulting pressure build up on the piston end 82 causes the loading piston to go down, as viewed in Fig. 3, and bottom on the stop 73. The compressed spring 79 holds the ball against lifting and resists flow to the sump. A constant and positive pressure is thus available to the actuator valves.

The control valve will continue to function in the normal manner even though a tolerable or normal leakage of oil takes place in the system. The pressure may drop without affecting the position of the loading plunger because of the large differential in the areas of the piston end 82 and the bore 76.

This vent type control valve permits the use of closed center valves without the use of an unloading valve and accumulator. The cylinder pressures will not build up to pump pressure unless the operator demands it. In addition the pressure at each point of utilization, such as brake or clutch cylinders, may be controlled independently of one another.

The actuator valves are connected together so that the pressure and tank lines are in parallel and the vent lines are in series. As a result, actuation of any valve in the bank will close the normally open vent line but will not close the pump and tank lines. The vent line actuates the pressure control valve which in turn determines the maximum pump pressure.

The system is so designed that with the pressure control valve open, the pump pressure is controlled at a relatively low pressure on the order of 50 p.s.i. with the actuator valve in the de-energized position (valve C of Fig. 1). When any one of the actuator valves is operated, the control valve vent line closes and the pump pressure builds up to a working pressure, for example, 1,600 p.s.i. the control spool of the actuator valve moves until it has ported the cylinder port to the pump pressure port and high pressure fluid is then metered to the cylinder port. The pressure at the cylinder builds up until the hydraulic force it creates against the control area of the control spool exceeds the control spring force.

The control spool then moves back and shuts off the pressure port and opens the tank port. The cylinder port pressure is then reduced by metering out fluid to tank until the control spool is in equilibrium and the cylinder port pressure is proportional to the lever force. Release of the control lever reduces the cylinder port pressure to zero.

Manual operation is also provided for the actuator valves, in the event of power failure, by means of a master-slave system. In the event of power failure, biasing the control spool will not result in pressure at the source of utilization. Continued movement of the spool is then made by the operator until the spool engages the master piston which in turn displaces fluid trapped in cylinder, forcing fluid into the brake cylinder or other unit being operated. Thus manual braking is provided.

The hydraulic system is highly flexible as to the functions it can perform. A wide and infinitely variable range of pressures may be furnished by the actuator valves to the brake and clutch cylinders, from zero to maximum pump pressure. Good operator "load sense" is provided because braking effort at the actuating lever will be proportional to the pressure at the point of utilization, such as the brake or clutch cylinder. A number of actuator valves may be simultaneously operated at different pressures in each. Manual braking is assured in the event of power failure by a master-slave arrangement.

Various modes of carrying out the invention are contemplated as being within the scope of the following claims particularly pointing out and distinctly claiming the subject matter which is regarded as the invention.

I claim:

1. A power operated master cylinder unit comprising, a housing defining a cylinder at one of its ends, a constantly open reservoir passageway through the other end of said housing, a bore between said cylinder and said reservoir passageway, a vent passage extending through said housing, a piston having a head and a sleeve adapted to reciprocate in said cylinder and bore respectively, a control spool extending from said housing and slidingly mounted in said piston for limited axial movement relative thereto and for moving said piston between de-energized and braking positions, said sleeve blocking said vent passage when said piston is in said braking position, said sleeve having a groove registrable with said vent passage for opening the latter when said piston is in said de-energized position, said piston being recessed to form an annular chamber with said cylinder, a pressure fluid inlet passageway extending into said housing and in constant communication with said chamber regardless of the positon of said piston, said spool having a pressure control groove and a prefill groove, said piston having a prefill passage adapted to place said cylinder in fluid communication with said reservoir passageway via said prefill groove so as to equalize the pressure therebetween when said spool is in the de-energized position, a control area in said housing, said piston having passages adapted to place said chamber in fluid communication with said control area via said control groove when said control spool is moved relative to said piston to a fluid pressure delivering position, and means between said spool and said piston and biasing them away from said fluid pressure delivering position.

2. A fluid power unit having a cylinder, a constantly open reservoir passageway thorugh said unit, a bore between said cylinder and said reservoir passageway, a vent passage extending through said unit, a piston having a head and a sleeve adapted to reciprocate in said cylinder and bore respectively, a control spool extending from said unit and slidingly mounted in said piston for limited axial movement relative thereto and for moving said piston between de-energized and braking positions, said piston blocking said vent passage when in said braking position, said piston having a groove registrable with and opening said vent passage when in said de-energized position, said piston being recessed to form an annular chamber with said cylinder, a pressure fluid inlet passageway extending into said unit and in constant communication with said chamber regardless of the position of said piston, said spool having a pressure control groove and a prefill groove, said piston having a prefill passage adapted to place said cylinder in fluid communication with said reservoir passageway via said prefill groove so as to equalize the pressure therebetween when said spool is in the de-energized position, a control area in said housing, and passages in said piston and adapted to place said chamber in communication with said control area via said control groove when said control spool is moved relative to said piston.

3. A power operated master cylinder unit comprising, a housing having a cylinder at one end and a constantly open reservoir passageway through its other end, a bore connecting said cylinder and said reservoir passageway, a vent passage extending through said housing and communicating with said bore, a piston having a head and a sleeve adpted to reciprocate in said cylinder and bore respectively, a control spool mounted in said piston for limited axial movement relative thereto and for moving said piston between de-energized and braking positions, said sleeve blocking said vent passage when said piston is in said braking position, said sleeve having a groove registrable with said vent passage when in said de-energized position, said piston forming an annular chamber with said cylinder, a pressure fluid inlet passageway extending into said housing and in constant communication with said chamber regardless of the position of said piston, said spool having a pressure control groove and prefill groove, said piston having a prefill passage adapted to place said cylinder in fluid communication with said reservoir passageway via said prefill groove so as to equalize the pressure therebetween when said spool is in the de-energized position, a control area in said housing and defined by said cylinder and piston, said piston having passages adapted to place said chamber in fluid communication with said control area via said control groove when said control spool is moved relative to said piston to a fluid pressure delivering position, means between said spool and said piston and biasing them away from said fluid pressure delivering position, and means urging said piston to said de-energized position.

References Cited in the file of this patent

UNITED STATES PATENTS

| | | |
|---|---|---|
| 1,667,698 | Eggleston | Apr. 24, 1928 |
| 1,890,010 | Vickers | Dec. 6, 1932 |
| 2,004,078 | McDougall | June 4, 1935 |
| 2,057,088 | De Millar | Oct. 13, 1936 |
| 2,136,318 | Rossmann | Nov. 8, 1938 |
| 2,251,275 | Ernst | Aug. 5, 1941 |
| 2,282,472 | Herman et al. | May 12, 1942 |
| 2,359,949 | Van Der Werff | Oct. 10, 1944 |
| 2,464,367 | Balogh et al. | Mar. 15, 1949 |
| 2,486,087 | Wright | Oct. 25, 1949 |
| 2,517,005 | MacDuff | Aug. 1, 1950 |
| 2,544,042 | Pontius | Mar. 6, 1951 |
| 2,573,563 | Gardiner | Oct. 30, 1951 |
| 2,586,932 | Gardiner et al. | Feb. 26, 1952 |
| 2,651,324 | Hodgson et al. | Sept. 8, 1953 |
| 2,670,715 | Conway | Mar. 2, 1954 |
| 2,757,512 | Foreman | Aug. 7, 1956 |